United States Patent
Hohjoh

(10) Patent No.: US 8,983,140 B2
(45) Date of Patent: *Mar. 17, 2015

(54) IMAGE PROCESSING UNIT, IMAGE PROCESSING METHOD, AND IMAGE PROCESSING PROGRAM TO CORRECT BLURS AND NOISE IN AN IMAGE

(75) Inventor: Daisuke Hohjoh, Narashino (JP)

(73) Assignee: Ricoh Company, Ltd., Tokyo (JP)

( * ) Notice: Subject to any disclaimer, the term of this patent is extended or adjusted under 35 U.S.C. 154(b) by 124 days.

This patent is subject to a terminal disclaimer.

(21) Appl. No.: 13/809,078

(22) PCT Filed: Jun. 6, 2011

(86) PCT No.: PCT/JP2011/063433
§ 371 (c)(1),
(2), (4) Date: Jan. 8, 2013

(87) PCT Pub. No.: WO2012/005081
PCT Pub. Date: Jan. 12, 2012

(65) Prior Publication Data
US 2013/0114862 A1    May 9, 2013

(30) Foreign Application Priority Data
Jul. 8, 2010    (JP) .................................. 2010-155869

(51) Int. Cl.
*G06K 9/00*    (2006.01)
*G06K 9/68*    (2006.01)
(Continued)

(52) U.S. Cl.
CPC .............. *G06K 9/68* (2013.01); *H04N 5/23277* (2013.01); *G06T 5/50* (2013.01); *G06T 7/2013* (2013.01); *G06T 2207/20021* (2013.01)
USPC ....................................................... 382/107

(58) Field of Classification Search
None
See application file for complete search history.

(56) References Cited

U.S. PATENT DOCUMENTS

| 2008/0180535 A1 | 7/2008 | Habuka et al. |
| 2009/0185721 A1 | 7/2009 | Hiraga et al. |

(Continued)

FOREIGN PATENT DOCUMENTS

| EP | 2 075 756 A1 | 7/2009 |
| JP | 9-130669 | 5/1997 |

(Continued)

OTHER PUBLICATIONS

International Search Report issued Jul. 26, 2011 in PCT/JP2011/063433 filed Jun. 6, 2011.

(Continued)

*Primary Examiner* — Bhavesh Mehta
*Assistant Examiner* — Siamak Harandi
(74) *Attorney, Agent, or Firm* — Oblon, McClelland, Maier & Neustadt, L.L.P.

(57) ABSTRACT

An image processing unit includes a memory unit in which continuously captured images including a reference image and a comparative image are stored, an image dividing unit to divide the reference image and the comparative image into image blocks of a predetermined size, a mean value calculator unit to calculate a mean value of pixel outputs in each image block of each of the reference and comparative images, a threshold determining unit to determine a threshold according to a mean value of pixel outputs of an image block of the reference image, and a determiner unit to compare the threshold with a difference value of the mean values of the pixel outputs in the image blocks of the reference and comparative images to be synthesized and determine whether the image blocks of the reference and comparative images are suitable for image synthesis based on a result of the comparison.

18 Claims, 14 Drawing Sheets

(51) Int. Cl.
*H04N 5/232* (2006.01)
*G06T 5/50* (2006.01)
*G06T 7/20* (2006.01)

(56) References Cited

U.S. PATENT DOCUMENTS

| | | |
|---|---|---|
| 2009/0295938 A1* | 12/2009 | Nikkanen .................. 348/223.1 |
| 2010/0085447 A1 | 4/2010 | Kanemitsu et al. |
| 2012/0086829 A1 | 4/2012 | Hohjoh |
| 2013/0050516 A1 | 2/2013 | Hojo |

FOREIGN PATENT DOCUMENTS

| | | |
|---|---|---|
| JP | 2000-228747 | 8/2000 |
| JP | 3935500 | 3/2007 |
| JP | 2007-202098 | 8/2007 |
| JP | 2008-42746 | 2/2008 |
| JP | 2009-8936 | 1/2009 |
| JP | 2009-10566 | 1/2009 |
| JP | 2009-147468 | 7/2009 |
| JP | 2009-164857 | 7/2009 |
| JP | 2010-34964 | 2/2010 |
| JP | 2010-93470 | 4/2010 |
| WO | WO 2009/153836 A1 | 12/2009 |

OTHER PUBLICATIONS

Extended European Search Report issued Jun. 13, 2014, in European Patent Application No. 11803417.2.
Korean Notice of Patent Grant Right issued Jan. 21, 2014, in Korean Patent Application No. 10-2013-7001543.

* cited by examiner

FIG. 5A

| DIFFERENCE VALUE | THRESHOLD |
|---|---|
|  |  |
| 501 | 11 |
| 502 | 11.01 |
| 503 | 11.02 |
|  |  |
| 2000 | 22 |
| 2001 | 22.001 |
| 2002 | 22.002 |
| — | — |

FIG. 5B

| DIFFERENCE VALUE | THRESHOLD |
|---|---|
| 100 | 5 |
| 500 | 11 |
| 1000 | 15.5 |
| 1500 | 18 |
| 2000 | 22 |
| 3000 | 27 |
| 4000 | 31 |

SUBJECT X

PROFILE R

SUBJECT X

GHOST Z

PROFILE R

SUBJECT X

IMAGE PROCESSING UNIT, IMAGE PROCESSING METHOD, AND IMAGE PROCESSING PROGRAM TO CORRECT BLURS AND NOISE IN AN IMAGE

CROSS REFERENCE TO RELATED APPLICATION

The present application is based on and claims priority from Japanese Patent Application No. 2010-155869, filed on Jul. 8, 2010, the disclosure of which is hereby incorporated by reference in its entirety.

TECHNICAL FIELD

The present invention relates to an image processing unit, an image processing method and an image processing program which can correct blurs and noise in an image due to camera shakes or else with high precision without crashing the image.

BACKGROUND ART

In the recent years, by making use of the speed-up operation of an image sensor such as CMOS, digital cameras with various functions have been developed. For example, there is one capable of continuously storing five images or more per second or one capable of high-speed video shooting at 1000 fps or more. It is known that such digital cameras include an image processing unit to synthesize continuously shot images for the purpose of removing from images blurs caused by camera shakes or noise due to long-time exposure. By image synthesis, it is able to average random noise and reduce noise due to camera shakes or shooting in the dark.

To synthesize continuously shot images, it is necessary to decide one of the images as a reference image and align positions of the other images (comparative images) with that of the reference image. For images of a completely still subject, this position alignment is done by making sizes of the images equal to each other. However, for images including a moving subject, it is needed to determine a direction in which the subject is moving and then align the positions according to the motion of the subject. Image synthesis without subject's motion taken into account results in increasing blurs and noise in the image. Japanese Patent No. 3935500 (Reference 1) discloses an image processing unit which is configured to determine motion of a subject first and synthesize images while aligning positions of the images based on data on the motion, for example.

Further, to prevent an image from being crashed (ghosts or else) by image synthesis of a moving subject, there is a known image processing method of dividing each of a reference image and a comparative image into very small image blocks and determining a synthesis rate according to a difference in RGB output values of each image block. For example, Japanese Patent Application Publication No. 2009-164857 (Reference 2) discloses an image processing method to determine for each image block whether or not images should be synthesized, synthesize image blocks when a difference value in RGB output values (mean RGB values) of the image blocks is below a predetermined threshold and not to synthesize them when the difference value exceeds the predetermined threshold.

There is a problem with determining an image synthesis using a predetermined threshold as in the image processing method disclosed in Reference 2. Images are captured with an image sensor in which random noise occurs in proportion to an exposure amount so that noise in a light portion of a subject image is larger than that in a dark portion and an absolute value of a difference value in images is large. Accordingly, to correct noise in a light portion by image synthesis, a threshold for determining whether or not to execute image synthesis need be set to a large value, which realizes accurate correction of motion of a subject in the light portion of image. However, the large threshold set for the light portion is too large for the dark portion of a subject image, making it impossible to detect motion of a subject in the dark portion and leading to erroneous determination on the image synthesis. Based on the erroneous determination, images of a moving subject are synthesized and a crash (ghost or the like) occurs in the synthesized image.

FIGS. 14A to 14C and 15 show results of image synthesis using different thresholds. An image in FIG. 14A is a reference image, and although not shown, three continuously captured comparative images are used for the image synthesis. FIG. 14B shows a result of image synthesis when a threshold for determining image synthesis is set for a dark portion of an image, for example. In FIG. 14B a subject X is a moving subject and image synthesis is correctly determined so that profile of the image is clear and includes no crash such as ghosts.

Meanwhile, FIG. 14C shows a result of image synthesis when a threshold for determining image synthesis is set for a light portion of an image, for example. In FIG. 14C a moving subject X is dark and a difference value in the reference image and the comparative image is small and unlikely to exceed a large threshold set for the light portion. Because of this, the images are erroneously determined to be suitable for image synthesis, resulting in generation of an image with profiles R along the motion of the subject X or a ghost Z.

Further, when the threshold is set for a dark portion of an image, noise Y conspicuously occurs only in a light portion of the image, as shown in FIG. 15, for example. That is, a locally bright area such as headlights of a car or streetlights is determined to be unsuitable for image synthesis while the surrounding image blocks are determined to be suitable. Accordingly, the image blocks corresponding to the bright area are not synthesized and the averaging of noise is not achieved by the image synthesis so that noise is conspicuous in the locally bright area.

As described above, using a fixed threshold, suitability of images for image synthesis cannot be accurately determined and as a result, the image synthesis is not properly done. This induces occurrence of ghosts or distinctive noise in images and causes image crash.

SUMMARY OF THE INVENTION

The present invention aims to provide an image processing unit, an image processing method, and an image processing program which can accurately synthesize continuously captured images for image correction without occurrence of image crash by variably setting a threshold for determining execution/non-execution of image synthesis in accordance with pixel outputs of a reference image to be synthesized instead of setting a fixed threshold.

According to one aspect of the present invention, an image processing unit comprises a memory unit in which continuously captured images are stored, the images including a reference image and a comparative image different from the reference image; an image dividing unit configured to divide each of the reference image and the comparative image into image blocks of a predetermined size; a mean value calculator unit configured to calculate a mean value of pixel outputs in each image block of each of the reference image and the comparative image; a threshold determining unit configured to determine a threshold according to a mean value of pixel outputs of an image block of the reference image, the threshold being for determining whether image blocks of the reference image and the comparative image are suitable for image synthesis; and a determiner unit configured to compare the threshold determined by the threshold determining unit with a difference value of the mean values of the pixel outputs in the image blocks of the reference image and the comparative image to be synthesized and determine whether the image blocks of the reference image and the comparative image are suitable for image synthesis based on a result of the comparison.

BRIEF DESCRIPTION OF THE DRAWINGS

Features, embodiments, and advantages of the present invention will become apparent from the following detailed description with reference to the accompanying drawings:

FIGS. 5A, 5B show examples of a threshold table used in the image processing unit according to one embodiment of the present invention;

FIG. 11A shows an example of image synthesis of a prior art image processing unit while

FIG. 13A shows another example of image synthesis of a prior art image processing unit while

DESCRIPTION OF EMBODIMENTS

Hereinafter, an image processing unit and method according to embodiments of the present invention will be described in detail with reference to the accompanying drawings. The image processing unit according to one embodiment of the present invention can be incorporated in an imaging device. Therefore, a description will be made on an imaging device incorporating the image processing unit.

First Embodiment

Figure 1:
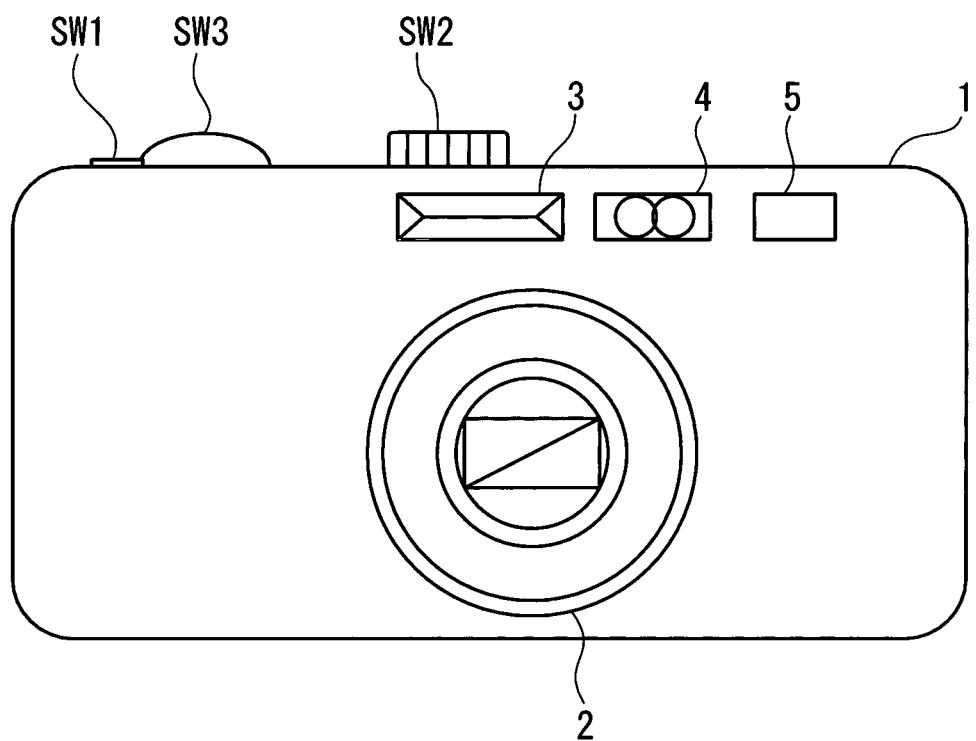
FIG. 1 shows an example of an imaging device incorporating an image processing unit according to one embodiment of the present invention.

FIG. 1 is a front view of an exemplary imaging device comprising the image processing unit according to a first embodiment. In FIG. 1 an imaging device 1 comprises a lens barrel unit 2 including a zoom lens and a focus lens, a stroboscopic unit 3, a ranging unit 4 to measure a distance to a subject, and an optical finder 5. On a front face a shutter button SW1, a mode dial SW2 to select a shooting mode, a jog dial switch SW3 are provided. By manipulation to the shutter button SW1, an image of a subject is captured via various lenses of the lens barrel unit 2, taken into a not-shown image sensor and stored as image data in a not-shown memory unit. Multiple images can be continuously stored in the memory unit by a single shooting operation. For example, four items of continuous image data can be stored by a single manipulation to the shutter button SW1.

Figure 2:
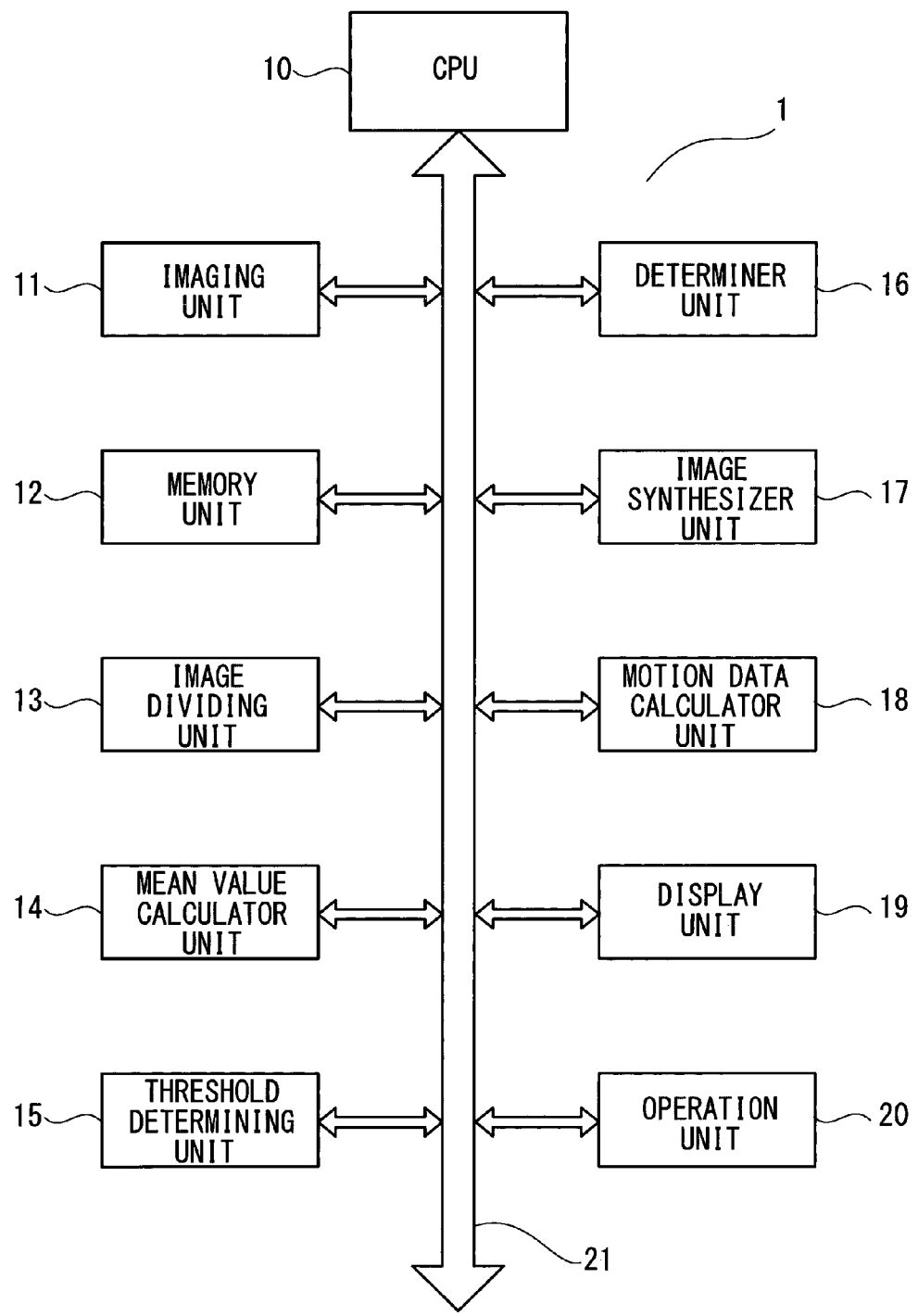
FIG. 2 is a block diagram of an example of a control system of the imaging device in FIG. 1.

Next, an example of function blocks of the imaging device 1 according to the present embodiment is described, referring to FIG. 2. In FIG. 2 the imaging device 1 comprises a CPU 10 as a processor to control operation of the entire device, an imaging unit 11, a memory unit 12, an image dividing unit 13, a mean value calculator unit 14, a threshold determining unit 15, a determiner unit 16, an image synthesizer unit 17, a motion data calculator unit 18, a display unit 19, an operation unit 20, and a data bus 21 connecting these units.

The imaging unit 11 is configured to acquire an optical image of a subject via an optical system, convert it into an electric signal with an image sensor, convert the electric signal into digital data and generate a file in a predetermined memory format. The file generated by the imaging unit 11 is referred to as "image" herein. The imaging unit 11 continuously captures a predetermined number of images, for example, four.

Continuously generated images by the imaging unit 11 are stored in the memory unit 12. The image dividing unit 13 is configured to divide an image stored in the memory unit into image blocks of a predetermined size, for example, 32 pixels by 32 pixels.

The mean value calculator unit 14 is configured to calculate a mean value of outputs of pixels included in each image block divided by the image dividing unit 13. The mean value of pixel outputs can be for example a mean value of respective outputs of R pixels, G pixels, and B pixels (hereinafter, mean RGB value) in a later-described second embodiment, a mean value of brightness of all the pixels included in each image block in a later-described third embodiment, a mean value of sums of respective outputs of R pixels, G pixels, B pixels included in each image block (hereinafter, sum of mean RGB values) in a fourth embodiment.

The threshold determining unit 15 is configured to determine a threshold for determining execution/non-execution of image synthesis based on the mean value of a reference image calculated by the mean value calculator unit 14. Herein, the reference image refers to one of continuously captured images stored in the memory unit 12. Images other than the reference image are referred to as comparative images. In the present embodiment the reference image is a first captured image among the continuously captured images. However, the reference image should not be limited to such an image, and it can be one with the highest level of focus among the continuously captured images, for example.

Next, the threshold is described. The threshold is used for determining whether image in each image block is suitable for image synthesis and differs according to a mean value of pixel outputs of an image block. At a small mean value of pixel outputs, a threshold is small, and the threshold increases as the mean value increases. First, the purpose of changing the threshold according to the mean value of pixel outputs in an image block will be described.

In general, there are two kinds of noise occurring in the image sensor, one depending on a magnitude of output and the other independent therefrom. The noise depending thereon is optical shot noise, charge transfer noise, noise of an operation amplifier and else. Optical shot noise arises from quantum efficiency of photodiode, and its magnitude depends on the number of photons. Even if the same amount of light is irradiated for the same amount of time, outputs of photodiode will vary, and the higher the outputs, the larger the variance. In other words, outputs of the image sensor (pixel outputs) are not always the same even when the same subject is captured under the same ambient condition. Regarding four images of the same subject captured under the same ambient condition, differences in pixel outputs of the four images differ between dark portions with low outputs and light portions with high outputs. Even in the same scene, pixel outputs of a dark portion (in low brightness) are likely to be below the threshold while those of a light portion (in high brightness) are likely to exceed the threshold. Images having pixel outputs below the threshold are synthesized but those having outputs over the threshold are not so that image crash such as a ghost in a dark portion and distinct noise in a light portion occurs. Thus, determining execution or non-execution of the image synthesis using the same threshold for dark portions and light portions causes degradation in image quality.

Figure 3:
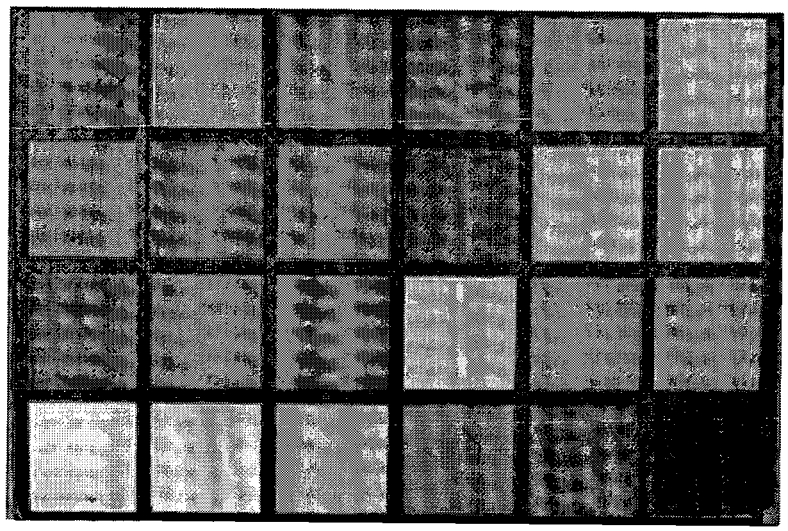
FIG. 3 shows an example of a chart image used in selecting a threshold as a reference of determining execution/non-execution of image synthesis.
Figure 4A:
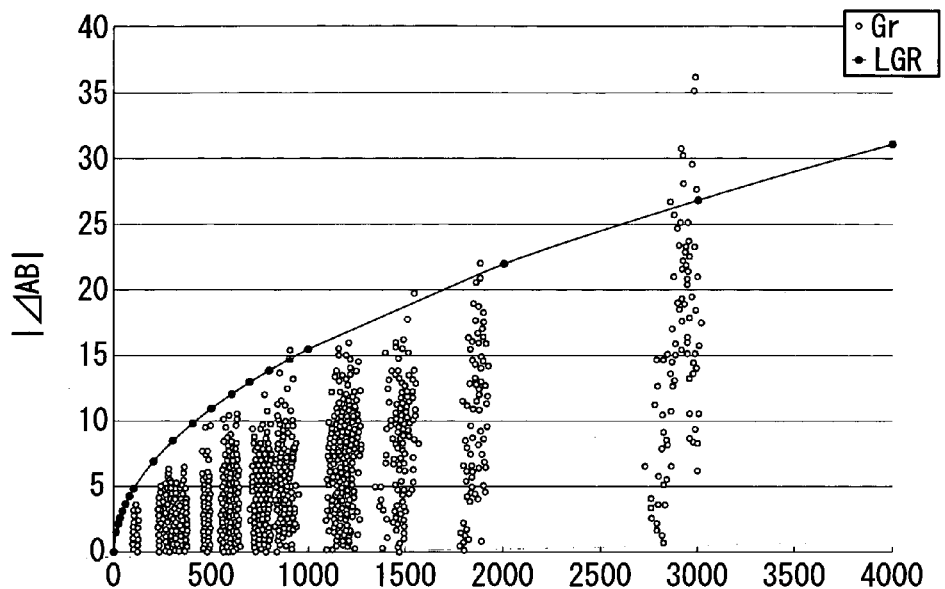
FIGS. 4A, 4B are graphs showing a distribution in difference value in pixel outputs of the chart images in FIG. 3.
Figure 4B:
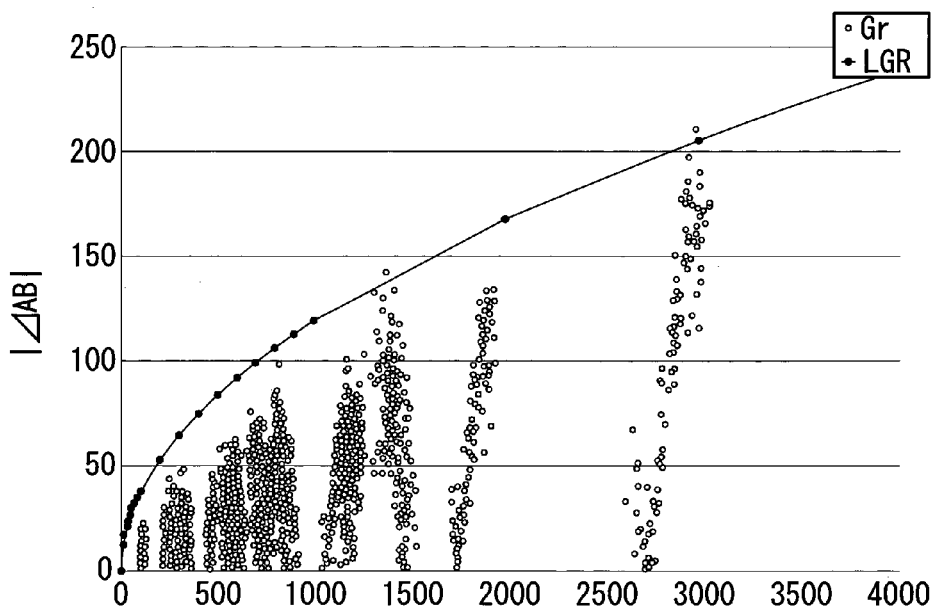

In view of the above, in the present embodiment a distribution of difference values of pixel outputs of continuously captured images of a Macbeth chart in FIG. 3 is calculated, and using this distribution, the threshold can be optimally set in accordance with outputs of a subject image. The Macbeth chart is shot at plural times by a digital camera mounted on a tripod under the same ambient condition and the same setting. FIGS. 4A, 4B are graphs plotting difference values in mean values of pixel outputs in one image block in the same position when the Macbeth chart in FIG. 3 is continuously shot twice and divided into image blocks. The abscissa shows pixel brightness (pixel outputs) while the ordinate shows difference values of pixel outputs. It is apparent from FIGS. 4A, 4B that differences take small values in dark portions and large values in light portions. How large the differences will be a matter of probability and the light portions show a larger variation.

FIGS. 4A, 4B show that distributed difference values form vertically long groups. This is because the Macbeth chart consists of rectangular areas (patches) each of which is colored in a single color, as shown in FIG. 3 and brightness of each patch is within a predetermined range. From FIGS. 4A, 4B, it is apparent that the difference values of pixel outputs are irreverent of the color of each patch and have almost no dependence on a light source. However, this does not hold true when a light source generates flickers or the like since absolute values of outputs thereof vary. In FIG. 4A, ISO sensitivity is 100 while in FIG. 4B it is 1,600. S/N ratio changes according to ISO sensitivity and so do the difference values of pixel outputs.

Curves in FIGS. 4A, 4B are approximate curves calculated from the distribution in the difference values of pixel outputs. The optimal threshold for each pixel value can be determined from the approximate curves. When the difference value of a target pixel output is below the curve, image synthesis is executed while when it is over the curve, image synthesis is not executed. Accordingly, the curves represent the thresholds. The imaging device 1 according to the present embodiment includes a threshold table which contains thresholds and mean values of pixel outputs associated with each other and is stored in advance in a nonvolatile work memory. FIGS. 5A, 5B show examples of threshold table containing the thresholds and the difference values of the mean values associated with each other. In FIG. 5A each possible difference value is associated with each threshold, and this requires a large amount of memory area. In FIG. 5B difference values of mean values of representative pixel outputs and corresponding thresholds are stored, and other thresholds can be calculated by interpolation. Since the mean value of pixel outputs varies with ISO sensitivity (FIGS. 4A, 4B), the threshold table in FIG. 5B can be prepared for each level of ISO sensitivity. Further, the threshold table is prepared for each of RGB pixels to more accurately determine the threshold by calculating the difference values of mean values of each of the RGB.

Referring back to FIG. 2, the determiner unit 16 is configured to compare the threshold determined by the threshold determining unit 15 and the difference value of the mean values of the pixel outputs of corresponding image blocks of a reference image and a comparative image. With the difference value being smaller than the threshold, it determines that the two images in this image block are suitable for image synthesis and places a flag to indicate execution of the image synthesis. Flags are stored in a not-shown work memory in association with information to identify image blocks.

The image synthesizer unit 17 is configured to synthesize the image blocks of the reference image with the comparative image with the flag indicating execution of image synthesis placed by the determiner unit 16. Then, if there is any of the continuously captured images stored in the memory unit 12 which has not been subjected to image synthesis determination, it uses this image as comparative image, sets a synthesized image as a new reference image to compare the comparative image with the new reference image. The determiner unit 16 repetitively determines whether or not the images are suitable for image synthesis.

The motion data calculator unit 18 is configured to calculate motion data for determining a relation between a reference image and a comparative image in a target image block. Motion data indicate amount of horizontal and vertical displacement of a comparative image from a reference image. The motion data are relative displacement of a reference image and a comparative image when the imaging device happens to slightly shake between a first shot and a second shot, causing a change in the angle of view, for example. It can be motion vectors indicating amount of parallel movement or affine parameters with a high degree of freedom in which rotation of an image or else is detected. The motion data between the reference image and the comparative image can be calculated using accurate affine parameters obtained by multi resolution to an input image and stepwise block matching to an image with low resolution to an image with high resolution.

The display unit 19 is configured to display image data and operation menus. The operation unit 20 includes the shutter button SW1, mode dial SW2 and else and is configured to convert predetermined operations into electric signals and transmit them to the CPU 10.

Second Embodiment

Figure 6:
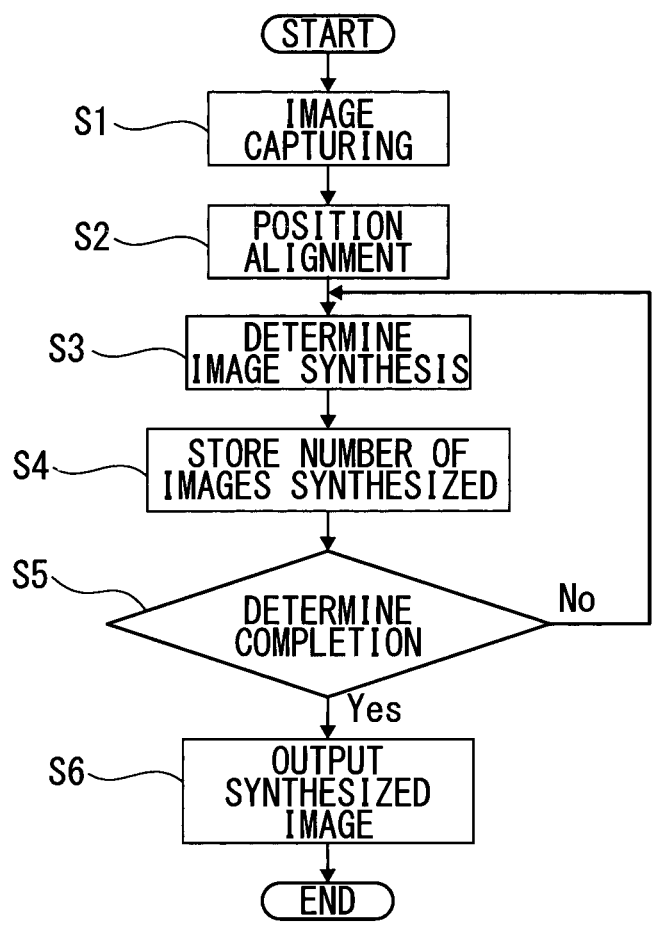
FIG. 6 is a flowchart of an exemplary operation of the image processing unit.

Next, an example of image processing executed by the image processing unit according to the first embodiment will be described with reference to a flowchart in FIG. 6.

In step S1 the imaging unit 11 continuously captures images of a subject at the same parameter setting (aperture diaphragm, exposure time, ISO sensitivity, angle of view and else), and the captured images are stored in the memory unit 12. Next, in step S2 the motion data calculator unit 18 calculates motion data for determining a relation between a reference image and a comparative image stored in the memory unit 12 and the CPU 10 aligns positions of the reference image and the comparative image based on the motion data. The position alignment in step S2 is to correct displacement of the comparative image from the reference image.

In step S3 a determination is made on whether or not the reference image and the comparative image are suitable for the image synthesis. In step S4 the number of images synthesized in each image block is stored for use in image processing after the image synthesis. The determination in step S3 will be described later in detail. The steps S2 to S4 are repetitively executed to all the images continuously captured (No in step S5). When it is determined that all the images have been processed (Yes in step S5), the image synthesizer unit 17 synthesizes the images and outputs a synthesized image in RAW format in step S6.

Figure 7:
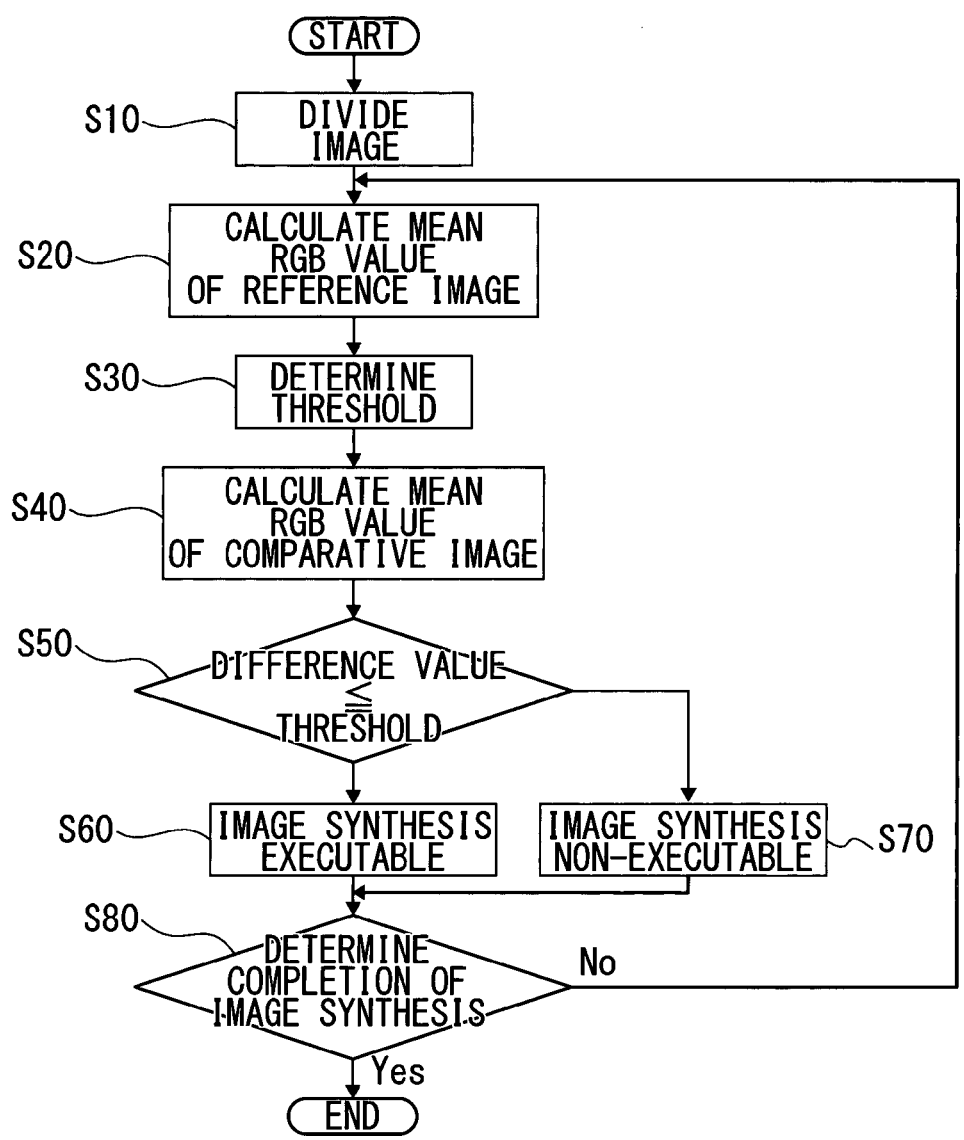
FIG. 7 is a flowchart of an exemplary image synthesis determining operation of the image processing unit in detail.

The determination on execution or non-execution of the image synthesis in step S3 is described in detail with reference to a flowchart in FIG. 7. The image dividing unit 13 divides each of the reference image and a first comparative image into image blocks of a predetermined size in step S10. Herein, the reference image refers to a first captured image among the continuously captured image and the first comparative image refers to a second captured image. The smaller the image block, the better the accuracy of determination on a moving subject in an image and the better the quality of a synthesized image. However, it increases amount of calculation and processing time. With a balance of processing time and image quality taken into account, the optimal size of the image block is pre-set to 32 pixels×32 pixels, for example. In the following, assumed that one image is divided into M image blocks.

The mean value calculator unit 14 calculates mean values (mean RGB values) of respective outputs of RGB pixels in a k-th image block of the reference image to determine threshold for determining execution/non-execution of the image synthesis in step S20. k is a value being 1 from M and in the first processing the mean RGB values of the first image block are calculated, where k is 1. When the size of each image block is 32 pixels×32 pixels, the number of R pixels and B pixels is 256 each and the number of G pixels is 512. The mean RGB values are calculated by dividing the sums of respective RGB pixel outputs by the total number of RGB pixels.

With use of an image sensor of a Bayer pattern in the imaging unit 11, Gr in RG array and Gb in GB array are discriminated in some cases, however, in the image processing unit according to the first embodiment Gr and Gb do not need to be discriminated. When there is a large difference in property of Gr and Gb or images are captured with a four-color image sensor, RGr and RGb can be discriminated or the mean values can be calculated for each of the four colors.

Next, the threshold determining unit 15 determines thresholds to determine whether the images in the image block are suitable for image synthesis based on the mean RGB value calculated in step S20, referring to a threshold table stored in a work memory in step S30. The thresholds are determined for respective RGB pixels. The mean RGB values of 12-bit RAW image are in a range from 0 to 4,095 and the number of thresholds is 4,096 correspondingly. As mentioned above referring to FIG. 4A, too many thresholds largely occupy a memory area. In the present embodiment, difference values of representative mean RGB values and corresponding thresholds are stored in the work memory as shown in FIG. 5B and thresholds are calculated by interpolation according to thresholds corresponding to approximate difference values to those calculated in step S20.

Then, in step S40 the mean value calculator unit 14 calculates mean values of respective outputs of RGB pixels in a k-th image block of the comparative image. k is a value from 1 to M. In the first processing k is 1 and mean RGB values of the first image block are calculated.

In step S50 the determiner unit 16 calculates difference values between mean RGB values of the reference image and those of the comparative image and compares the difference values and the thresholds (Th_R[k], Th_G[k], Th_B[k]) determined in step S30. With the difference values of all the RGB pixels being below the thresholds (Yes in step S50), data identifying the image block in question is stored in connection with a flag indicating synthesis-possible in the work memory in step S60 for the image synthesis of the reference image and the comparative image in a subsequent step. Meanwhile, with the difference value of any of the RGB pixels being over the threshold (No in step S50), and image synthesis is not executed on this image block.

The flags indicating synthesis-possible and synthesis-impossible are configured to identify a comparative image and an image block to be compared. For example, in a case where the $100^{th}$ image blocks of a reference image (0) and a first comparative image (1) are synthesis-possible, the flag can be expressed by a numeral combination such as 0:1:100:1. Also, when the $200^{th}$ image blocks of the reference image (0) and a second comparative image (2) are synthesis-impossible, the flag can be expressed by a numeral combination such as 0:2:200:0.

In step S80 a determination is made on whether the image synthesis determination is performed for all of the image blocks in step S80. When a result is negative, the steps S20 to S70 are repetitively executed until all of the image blocks are subjected to the determination (No in step S80).

Third Embodiment

Figure 8:
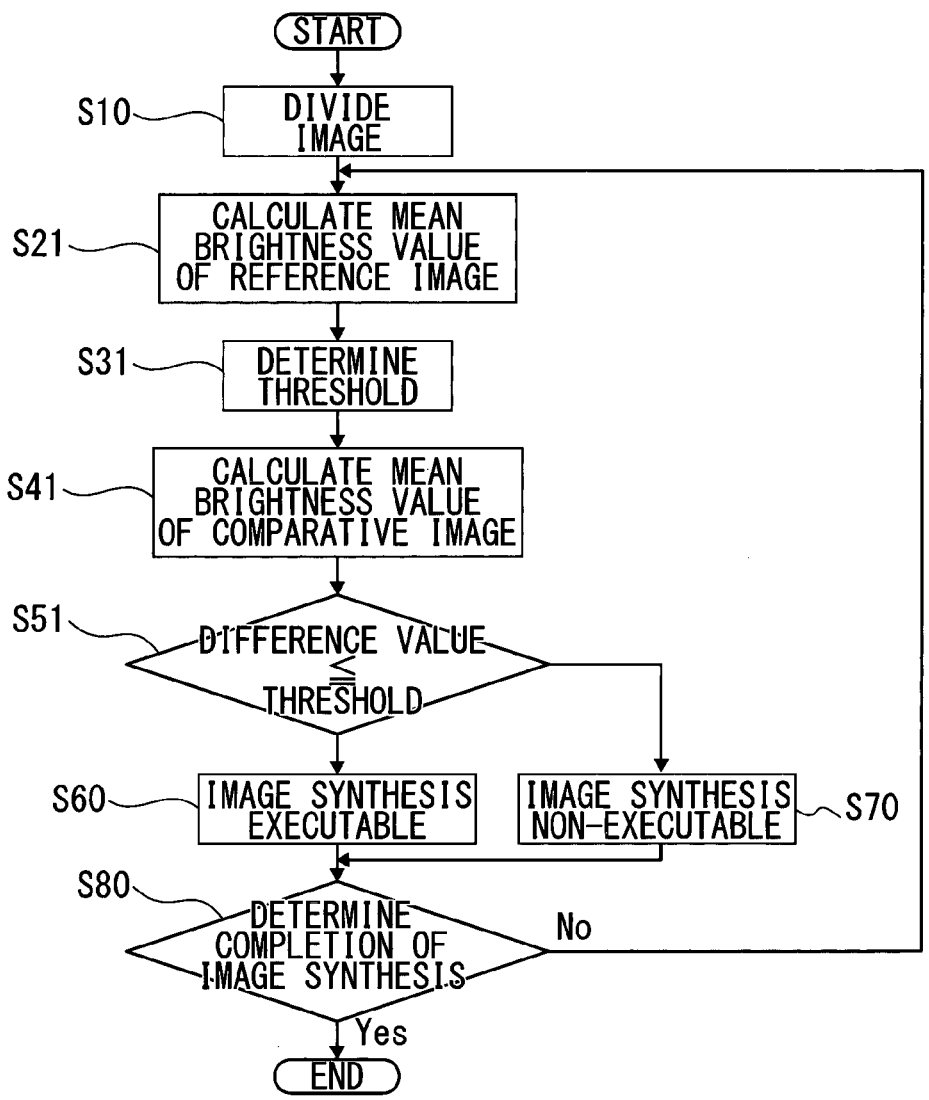
FIG. 8 is a flowchart of another exemplary image synthesis determining operation of the image processing unit in detail.

Another example of the image synthesis determination in step S3 is described in detail with reference to a flowchart in FIG. 8. The same operations as those in FIG. 7 are given the same step numbers in FIG. 8. First, in step S10 the image dividing unit 13 divides each of a reference image and a first comparative image into image blocks of a predetermined size. The mean value calculator unit 14 calculates a mean value of brightness of a k-th image block of the reference image to determine a threshold for determining execution/non-execution of the image synthesis in step S21.

The threshold determining unit 15 determines a threshold for determining whether images in the image block are suitable for image synthesis based on the calculated the mean brightness value in step S21, referring to the threshold table stored in the work memory. The threshold table contains a group of data as difference values of representative mean brightness values associated with thresholds based on a distribution in difference values of brightness of images of the Macbeth chart, as in FIG. 5B. Thresholds are calculated by interpolation according to thresholds corresponding to approximate difference values of the ones calculated in step S21.

In step S41 the mean value calculator unit 14 calculates a mean brightness value of a k-th image block of the comparative image. In step S51 the determiner unit 16 determines whether or not a difference value between the mean brightness values of the reference image and the comparative image is larger than the threshold. When the difference value is smaller than the threshold, a predetermined flag in a predetermined memory format indicating execution of image synthesis is stored to execute image synthesis on the k-th image block (Yes in step S51 and S60). Meanwhile, when the difference value is equal to or larger than the threshold, a predetermined flag in a predetermined memory format indicating non-execution of image synthesis is stored not to execute image synthesis on the k-th image block (No in step S51 and S70).

The steps in S20 to S70 are repetitively executed until the determination on the image synthesis for all the image blocks of the reference image and the comparative image is completed (No in step S80).

Thus, by using the mean brightness value for determining execution/non-execution of the image synthesis, it is able to process the comparison with the threshold at high speed (step S51) and reduce process time of the entire image synthesis process.

Fourth Embodiment

Figure 9:
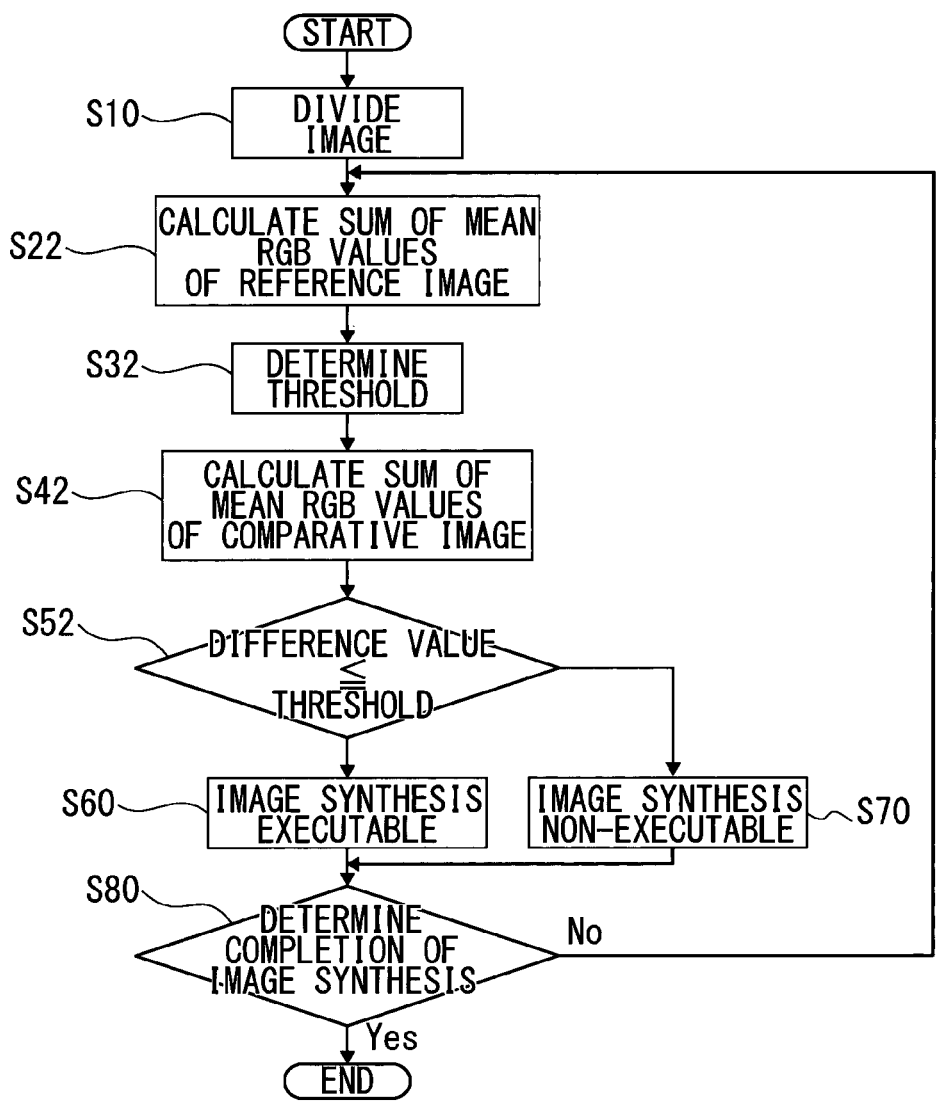
FIG. 9 is a flowchart of another exemplary image synthesis determining operation of the image processing unit in detail.

Next, another example of the image synthesis determination in step S3 is described in detail with reference to a flowchart in FIG. 9. Note that the same steps in those in FIGS. 7-8 are given the same step numbers. First, in step S10 the image dividing unit 13 divides each of the reference image and a first comparative image into image blocks of a predetermined size. The mean value calculator unit 14 calculates a sum of mean RGB values of a k-th image block in order to determine the threshold for determining execution/non-execution of the image synthesis in step S22. The sum of mean RGB values is a sum of mean values of respective outputs of RGB pixels included in the image block.

In step S32 the threshold determining unit 15 determines a threshold for determining whether images in the image block are suitable for image synthesis based on the sum of mean RGB values calculated in step S22, referring to the threshold table stored in the work memory. As described above, the threshold table contains a group of data as difference values of sums of representative mean RGB values associated with thresholds based on a distribution in difference values of brightness of images of the Macbeth chart, as shown in FIG. 5B. Thresholds are calculated by interpolation according to thresholds corresponding to approximate difference values of the ones calculated in step S22.

The mean value calculator unit 14 calculates the sum of mean RGB values of a k-th image block of the comparative image in step S42. The determiner unit 16 determines whether or not a difference value between the sum of mean RGB values of the reference image and that of the comparative image is larger than the threshold in step S52. When the difference value is smaller than the threshold, a predetermined flag in a predetermined memory format indicating execution of image synthesis is stored to perform image synthesis on the k-th image block (Yes in step S52 and S60). Meanwhile, when the difference value is equal to or larger than the threshold, a predetermined flag in a predetermined memory format indicating non-execution of image synthesis is stored not to perform image synthesis on the k-th image block (No in step S53 and S70).

The steps in S20 to S70 are repetitively executed until the determination on the image synthesis for all the image blocks of the reference image and the comparative image is completed (No in step S80).

Thus, by using the sum of mean RGB values for determining execution/non-execution of the image synthesis, it is able to process the comparison with the threshold at high speed (step S52) and reduce process time of the entire image synthesis process.

Fifth Embodiment

Now, effects of an image processing method according to one embodiment of the present invention are described, using the image synthesis of four continuously captured images in FIGS. 10-13 as an example. FIG. 10A shows an example of one of the captured images as a reference image. The other images are not shown since photographic condition such as filed of view and a subject in the images do not differ. For simplicity, an image A is divided into areas as train of cars B, sky C, and person D as shown in FIG. 10B.

Figure 10A:
FIGS. 10A, 10B show examples of a captured image of the image processing unit.
Figure 10B:
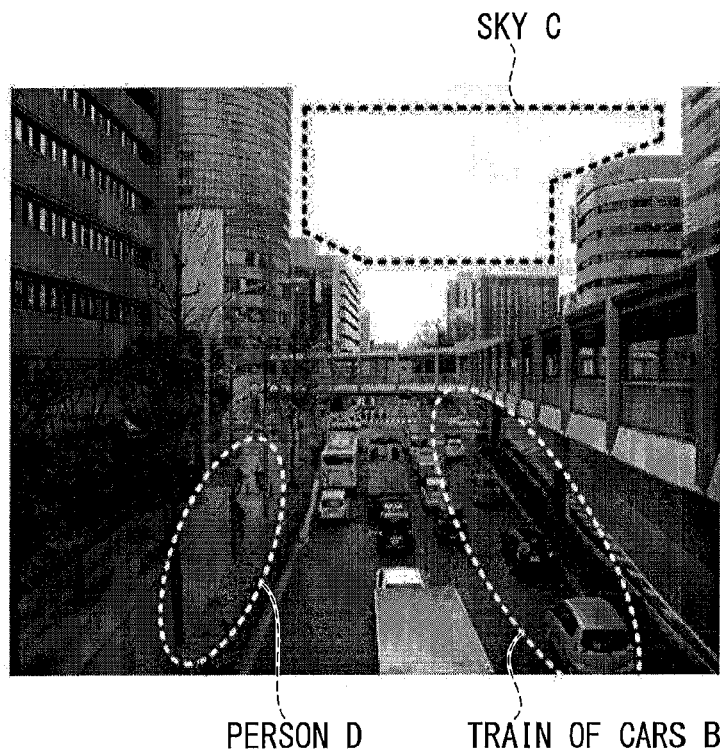
Figure 11A:
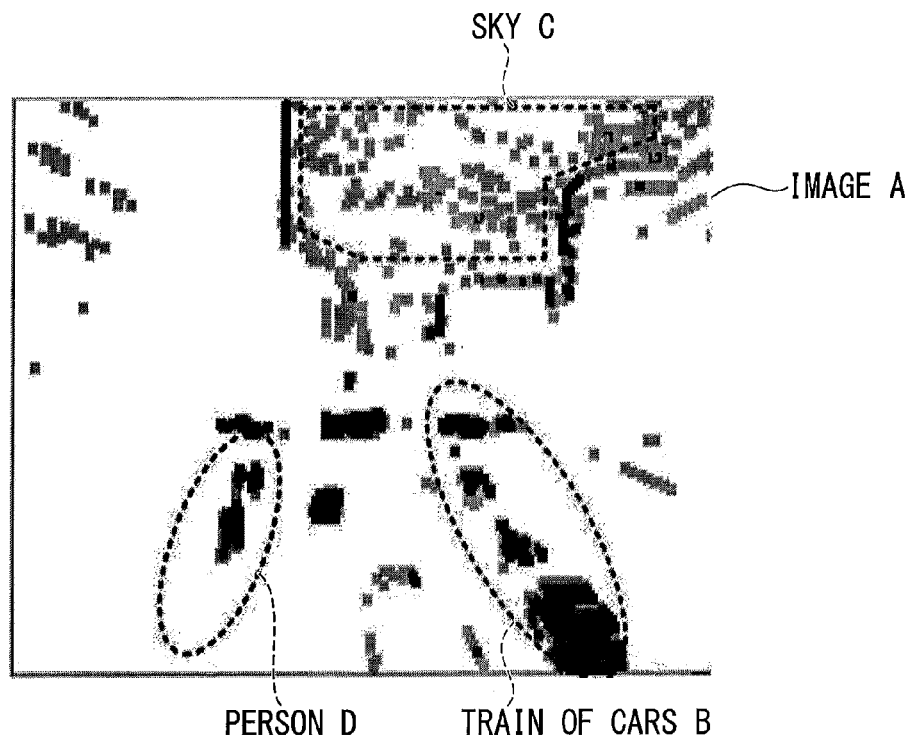
Figure 11B:
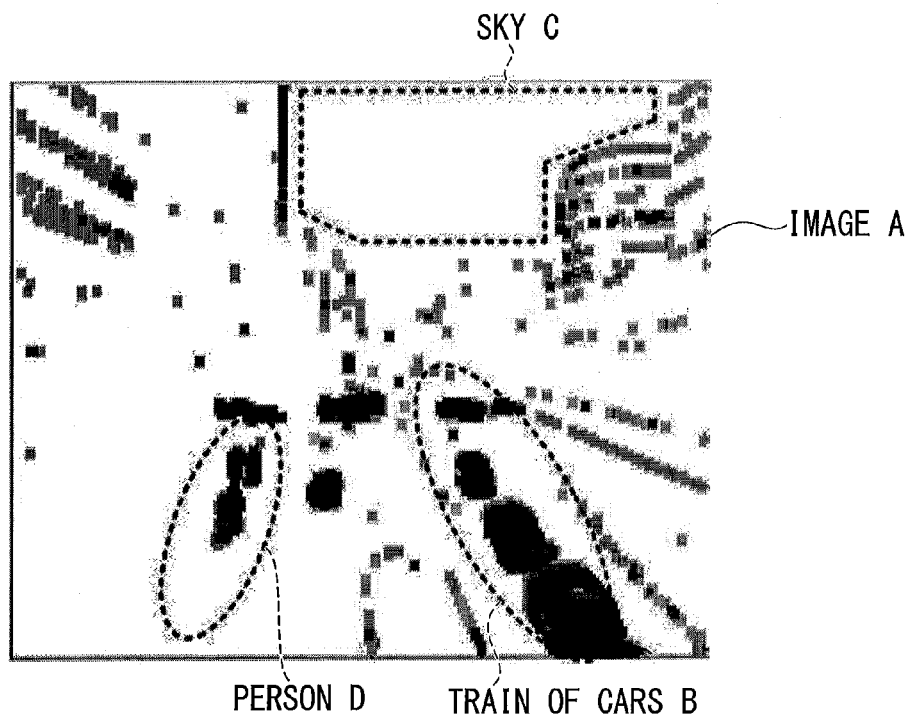
FIG. 11B shows an example of image synthesis of the image processing unit according to one embodiment of the present invention.

FIGS. 11A, 11B show examples of a synthesized image of the image A in FIG. 10A. In the drawings image blocks of four images synthesized are represented in white, those of three images synthesized are represented in light gray, those of two images synthesized are represented in dark gray, and those having not been subjected to image synthesis are represented in black. FIG. 11A is an example of a synthesized image by a prior art image synthesis while FIG. 11B is an example of the same by the image processing method according to one embodiment of the present invention.

In FIG. 11A the sky C as a still subject is represented in both light gray (three images synthesized) and dark gray (two images synthesized). This is because in the prior art image synthesis using a fixed threshold irrespective of pixel outputs, some portions of the still subject are determined to be suitable for image synthesis but other portions are determined to be unsuitable. Intrinsically, pixel outputs of a still subject such as sky should be constant, however, due to property of an image sensor, there is a large variation in pixel outputs of a light subject. Also, in the train of cars B and the person C, some portions are determined to be suitable for image synthesis and other portions are determined to be unsuitable. These moving subjects generally have large difference values so that they should not be determined to be suitable for image synthesis. However, regarding a very dark moving subject, difference values are likely, to be smaller than the threshold, resulting in erroneous determination for the image synthesis. Accordingly, ghost occurs in an image and noise is conspicuous in a light portion of the image generated by the prior art image synthesis.

To the contrary, in the image processing method according to one embodiment of the present invention, optimal thresholds are determined (calculated) from the mean values of pixel outputs and a determination on the image synthesis is made using the optimal threshold. In FIG. 11B the sky C is of four images synthesized while no image synthesis is done on the moving subjects as the train of cars B and person B. For image blocks including edge portions such as profile of a building with high contrast, even a small positional displacement cause them to be determined as a moving subject. The level of moving subject detection depends on a threshold table so that optimal values thereof can be arbitrarily decided in advance and stored in the work memory.

Figure 12:
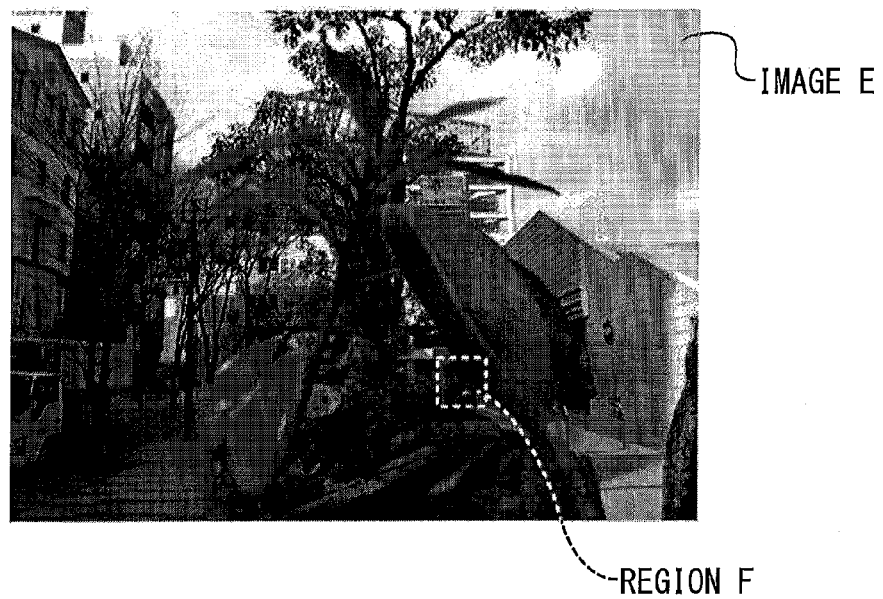
FIG. 12 shows another example of a capture image of the image processing unit.

Another example of the effects of the image processing method is described. FIG. 12 shows an image E captured in macro mode. The image processing unit according to the second embodiment is configured to calculate the respective mean values of RGB pixel outputs in an image block and determine thresholds for R, G, and B pixels, respectively. In other words, it compares the mean values of the RGB pixel outputs with the thresholds, respectively, for each image block of the reference image and the comparative image to determine execution/non-execution of the image synthesis (FIG. 7).

Figure 13A:
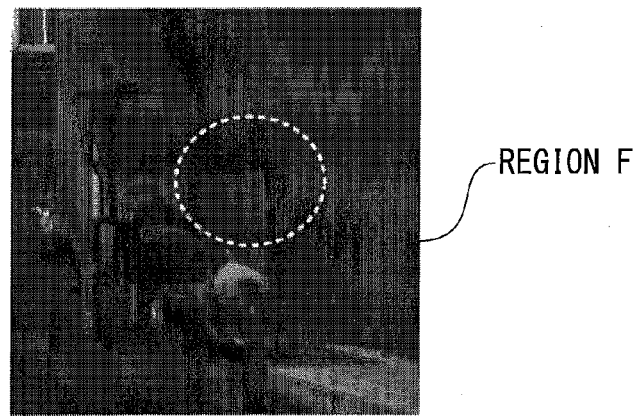
Figure 13B:
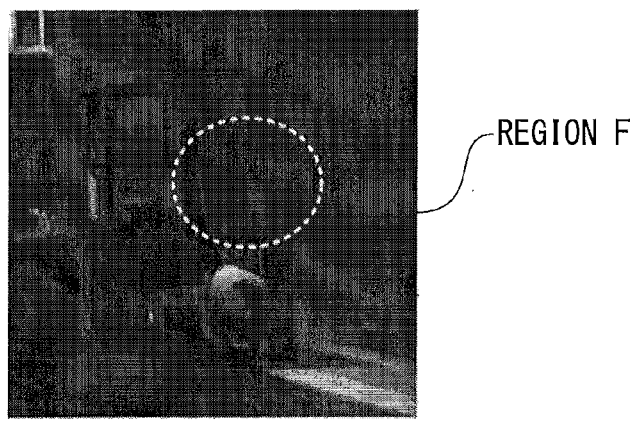
FIG. 13B shows another example of image synthesis of the image processing unit according to one embodiment of the present invention.
Figure 14A:
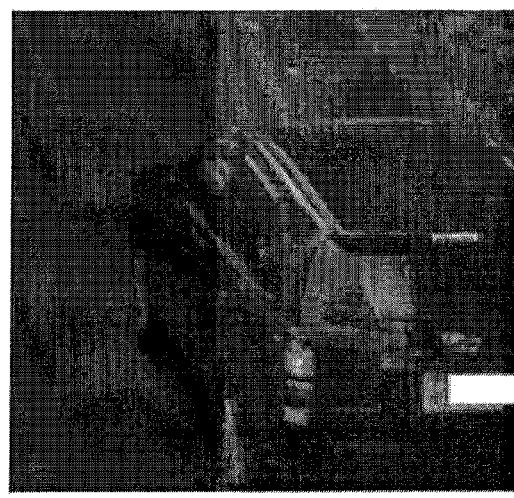
FIGS. 14A to 14C show example of image synthesis in a prior art image processing method.
Figure 14B:
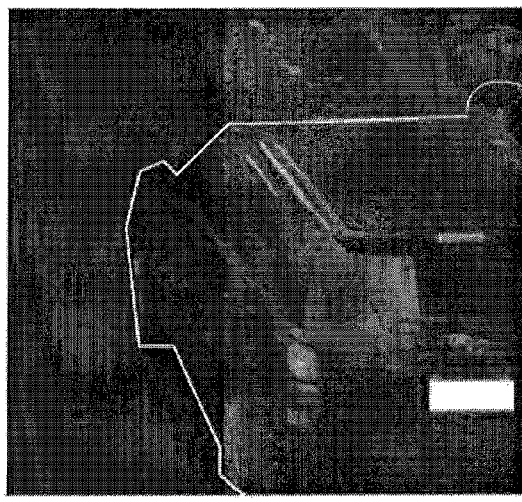
Figure 14C:
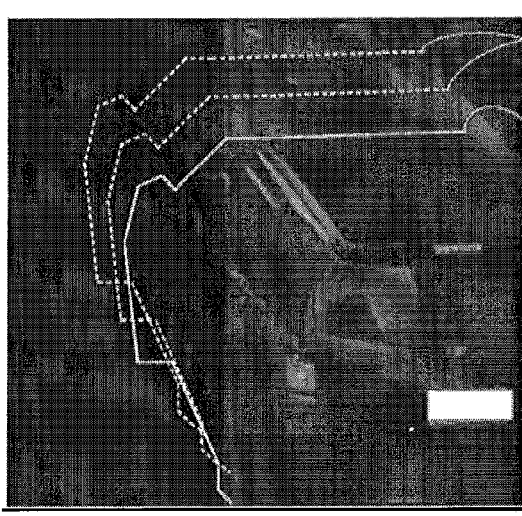
Figure 15:
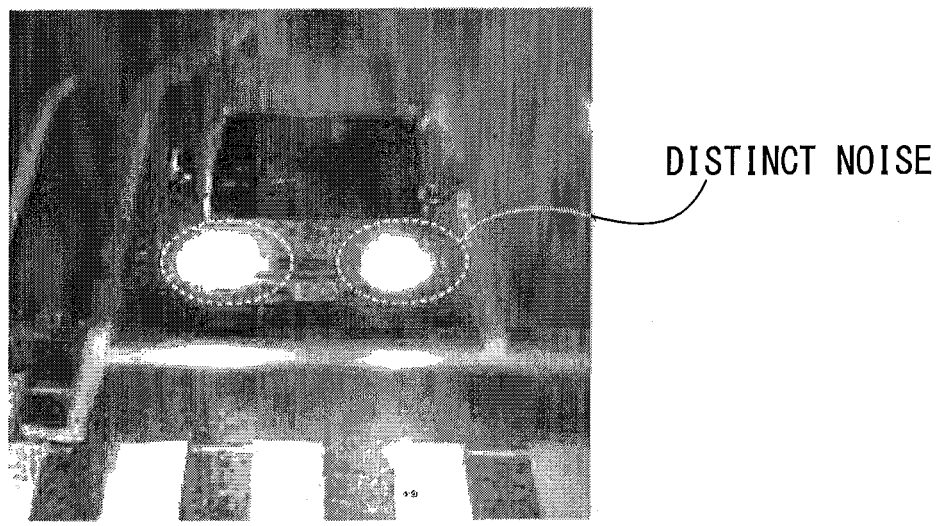
FIG. 15 shows another example of image synthesis in a prior art image processing method.

FIG. 13 show enlarged images of a region F of the image E in the FIG. 12. FIG. 13A shows an example of a synthesized image by the prior art image synthesis while FIG. 13B is an example of the same by the image processing method according to one embodiment of the present invention.

According to the prior art image processing method, difference values of pixel outputs of the reference image and the comparative image are calculated using total sum of pixel values in an image block to determine whether the images are suitable for image synthesis by comparing the difference values with a fixed threshold. The total sum of the image block is calculated by $\Sigma R+2^*\Sigma G+\Sigma B$ where RGB are pixel outputs. The mean value of the image block is calculated by the total sum/number of pixels. Only brightness information is used for determining a moving subject, and hues and chroma are not used.

Such a prior method has a problem in capturing subjects that visually completely different image blocks are determined to be suitable for image synthesis in a case where a subject at front (major subject) and a subject in the back (background) show approximate brightness in an image as shown in FIG. 13A. As a result, in the drawing the background overlaps with the major subject (plant leaves) and the image of the major subject is crashed.

Meanwhile, in the image processing method according to one embodiment of the present invention, determination on the image synthesis is made for the respective RGB pixels. This makes it possible to accurately detect color differences in foreground (major subject) and background and correctly determine that they should not be synthesized. As shown in FIG. 13B, the major subject is captured as a foreground with not overlapping with the background, and image crash is prevented.

The major subject of the images in FIGS. 12, 13A, 13B shows reddish color so that execution of the image synthesis can be determined based on data only on R pixels included in an image block. It is also possible to accurately determine execution of image synthesis of an image including a moving subject, using data only on one of RGB pixels.

Thus, this image processing method enables prevention of ghosts and distinctive noise in an image and realizes more accurate image processing.

The image processing method according to one embodiment of the present invention is applicable to image processing software operating on a personal computer in addition to an imaging device.

Although the present invention has been described in terms of exemplary embodiments, it is not limited thereto. It should be appreciated that variations or modifications may be made in the embodiments described by persons skilled in the art without departing from the scope of the present invention as defined by the following claims.

The invention claimed is:

1. An image processing unit comprising:
    an image divider configured to divide each of a reference image and a comparative image, different from the reference image, into image blocks of a predetermined size;
    a mean value calculator configured to calculate a first mean value of pixel outputs in each image block of the reference image and a second mean value of pixel outputs in each image block of the comparative image;
    a threshold determiner configured to determine a threshold according to the first mean value of pixel outputs of an image block of the reference image, the threshold being for determining whether the image blocks of the reference image and the comparative image are suitable for image synthesis; and
    a determiner configured to compare the threshold determined by the threshold determiner with a difference value that is a difference between the first mean value of pixel outputs in the image blocks of the reference image and the second mean value of pixel outputs in the image blocks of the comparative image and to determine whether the image blocks of the reference image and the comparative image are suitable for image synthesis based on a result of comparison.

2. The image processing unit according to claim 1, further comprising:
    a motion data calculator configured to calculate data on a motion between the reference image and the comparative image, wherein
    the mean value calculator is configured to calculate the first mean value of pixel outputs for each image block of the reference image and the second mean value of pixel outputs for each image block of the comparative image whose positions are associated with each other based on the calculated motion data, and
    the determiner is configured to determine whether the image blocks of the comparative image and reference image whose positions are associated with each other are suitable for image synthesis.

3. The image processing unit according to claim 1, wherein
    the first mean value of pixel outputs and the second mean value of pixel outputs calculated by the mean value calculator are mean values of each of R pixel outputs, G pixel outputs, and B pixel outputs in each image block, and
    the threshold determiner is configured to determine the threshold according to the mean values of each of the R pixel outputs, G pixel outputs, and B pixel outputs.

4. The image processing unit according to claim 1, wherein
    the first mean value of pixel outputs and the second mean value of pixel outputs calculated by the mean value calculator is a mean value of each of R pixel outputs, G pixel outputs, and B pixel outputs in each image block, and
    the threshold determiner is configured to determine the threshold according to a maximal value of respective mean values of the R pixel outputs, G pixel outputs, and B pixel outputs.

5. The image processing unit according to claim 1, wherein
    the first mean value of pixel outputs and the second mean value of pixel outputs calculated by the mean value calculator is a mean value of brightness of outputs of pixels included in each image block.

6. The image processing unit according to claim 1, wherein
    the threshold determiner is configured to determine different thresholds according to ISO sensitivity.

7. The image processing unit according to claim 1, further comprising
    an image synthesizer configured to synthesize the image block of the reference image and the image block of the comparative image determined as suitable for image synthesis by the determiner.

8. An image processing method, comprising:
    dividing each of a reference image and a comparative image, different from the reference image, into image blocks of a predetermined size;

calculating a first mean value of pixel outputs in each image block of each of the reference image and a second mean value of pixel outputs in each image block of the comparative image;

determining a threshold according to the first mean value of pixel outputs of an image block of the reference image, the threshold being for determining whether the image blocks of the reference image and the comparative image are suitable for image synthesis; and comparing the threshold with a difference value that is a difference between the first mean values of pixel outputs in the image blocks of the reference image and the second mean of pixel outputs in the image blocks of the comparative image and determining whether the image blocks of the reference image and the comparative image are suitable for image synthesis based on a result of said comparing.

9. The image processing method according to claim 8, further comprising:

calculating data on a motion between the reference image and the comparative image, wherein the first mean value of pixel outputs is calculated for each image block of the reference image and the second mean value of pixel outputs is calculated for each image block of the comparative image whose positions are associated with each other based on the calculated motion data, and a determination is made on whether the image blocks of the comparative image and reference image whose positions are associated with each other are suitable for image synthesis.

10. The image processing method according to claim 8, wherein:

the first mean value of pixel outputs and the second mean value of pixel outputs are mean values of each of R pixel outputs, G pixel outputs, and B pixel outputs in each image block, and the threshold is determined according to the mean values of each of the R pixel outputs, G pixel outputs, and B pixel outputs.

11. The image processing method according to claim 8, wherein the first mean value of pixel outputs and the second mean value of pixel outputs are mean values of each of R pixel outputs, G pixel outputs, and B pixel outputs in each image block, and the threshold is determined according to a maximal value of respective mean values of the R pixel outputs, G pixel outputs, and B pixel outputs.

12. The image processing method according to claim 8, wherein the first mean value of pixel outputs and the second mean value of pixel outputs are mean values of brightness of outputs of pixels included in each image block.

13. The image processing method according to claim 8, wherein different thresholds are determined according to ISO sensitivity.

14. The image processing method according to claim 8, further comprising:

synthesizing the image block of the reference image and the image block of the comparative image determined as suitable for image synthesis.

15. An image processing program stored on a non-transitory medium which causes a computer to function as the image processing unit according to claim 1.

16. The image processing unit according to claim 1, wherein the threshold determiner is configured to determine a different threshold for each image block of the reference image.

17. The image processing unit according to claim 16, wherein the different threshold for each image block of the reference image is determined in accordance with the first mean value of pixel outputs of each image block of the reference image.

18. The image processing unit according to claim 1, wherein a value of the threshold of each image block of the reference image is directly proportional to the first mean value of pixel outputs of each image block of the reference image.

* * * * *

UNITED STATES PATENT AND TRADEMARK OFFICE
CERTIFICATE OF CORRECTION

| | | |
|---|---|---|
| PATENT NO. | : 8,983,140 B2 | Page 1 of 1 |
| APPLICATION NO. | : 13/809078 | |
| DATED | : March 17, 2015 | |
| INVENTOR(S) | : Daisuke Hohjoh | |

It is certified that error appears in the above-identified patent and that said Letters Patent is hereby corrected as shown below:

Claims

In column 13, line 11, claim 8 change: "values" to --value--

In column 13, lines 12-13, claim 8 after "second mean" insert: --value--

Signed and Sealed this
Twenty-fourth Day of November, 2015

Michelle K. Lee
*Director of the United States Patent and Trademark Office*